Figure 1:
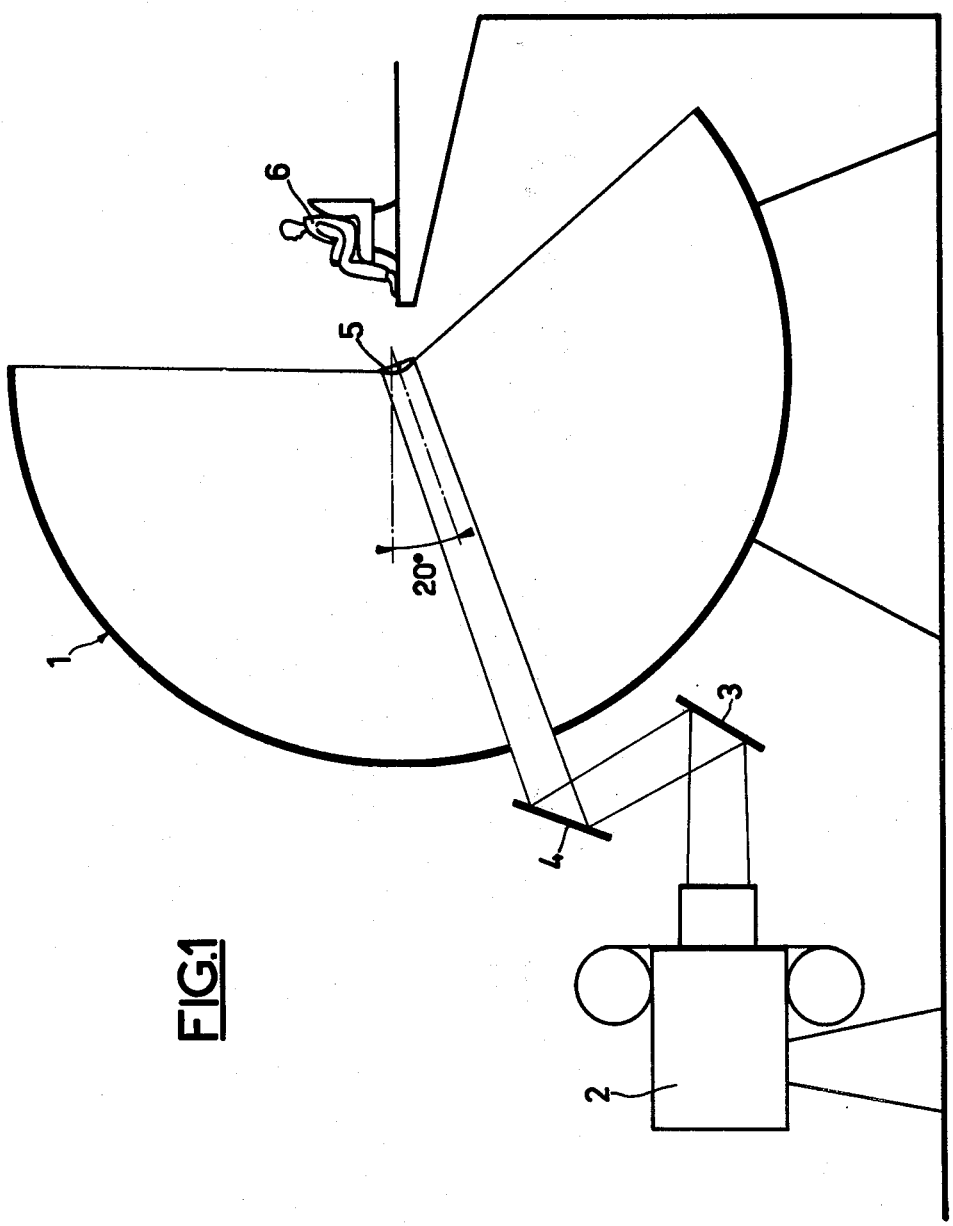

United States Patent [19]

Jaulmes

[11] Patent Number: 4,464,029
[45] Date of Patent: Aug. 7, 1984

[54] WIDE ANGLE FILM SHOOTING AND PROJECTION OF TRUNCATED IMAGES

[76] Inventor: Philppe Jaulmes, Bureau du Polygone, Avenue des Etats du Languedoc, 34000 Montpellier, France

[21] Appl. No.: 377,396

[22] Filed: May 12, 1982

Related U.S. Application Data

[63] Continuation of Ser. No. 207,465, Nov. 17, 1980, abandoned, which is a continuation of Ser. No. 943,557, Sep. 18, 1980, abandoned.

[30] Foreign Application Priority Data

Sep. 21, 1977 [FR] France .............................. 77 28510

[51] Int. Cl.$^3$ ............................................ G03B 37/00
[52] U.S. Cl. ...................................... 352/69; 352/43; 352/132
[58] Field of Search .................... 352/69, 86, 43, 131, 352/132

[56] References Cited

U.S. PATENT DOCUMENTS 3,420,605  1/1969  Kipping ................................ 352/69
3,539,249  11/1970 Jaulmes ................................ 352/69
3,998,532  12/1976 Dykes .................................. 352/69
4,070,098  1/1978  Buchroeder .......................... 352/69

FOREIGN PATENT DOCUMENTS 540068   2/1956  Italy ..................................... 352/69
373638   11/1963 Switzerland ......................... 352/69
17434    of 1898 United Kingdom ................. 352/69

Primary Examiner—Monroe H. Hayes
Attorney, Agent, or Firm—Brisebois & Kruger

[57] ABSTRACT

Wide angle film shooting and projection of images on the inside of a spherical screen is accomplished by first shooting a scene using a "fish-eye" lens to obtain truncated circular images with their truncations along a common edge of the film. The images are projected onto the concave screen through a tele-objective, and a convex mirror in the center of the screen so that truncated portions of the film images correspond to the upper portion of the screen, which is of least significance to a viewer. Images of diameter greater than the width of the film can thus be used without loss of significant information. Images with an angular field as great as 220° can be projected on the screen.

13 Claims, 5 Drawing Figures

WIDE ANGLE FILM SHOOTING AND PROJECTION OF TRUNCATED IMAGES

This is a continuation of application Ser. No. 207,465, filed Nov. 17, 1980, now abandoned; which was a continuation of Ser. No. 943,557, filed Sept. 18, 1980, now abandoned.

In the Published Patent in France, No. 2,052,230, which is the third certificate of addition to French Pat. No. 1,204,643 (of 1958), the Applicant has described a projection room equipped with a spherical screen dome having its axis of symmetry oriented at 45° downwards, and a projector comprising a tele-objective capable of producing a substantially plane intermediate image from a film of a particular type in front of a concave mirror placed near the centre of the said screen dome, the light rays emitted by the said projector passing through an orifice formed in the centre part of this screen dome.

This film consisted of juxtaposed round images obtained by means of a film-shooting objective of the so-called "fish-eye" type, and exhibiting progressive compression in the direction of their periphery.

The said concave mirror subsequently directed onto the said spherical screen dome the light rays emanating from the said intermediate image, and in doing so substantially compensated, because of the spherical shape of this dome and of the concave shape of the mirror, a systematic compression of the images of the said film which obey a linear distribution law.

However, with such an embodiment it was not possible to obtain an image offering a wider field than 160° whilst, for applications to flight simulators which form the subject of the present patent application, it is necessary to have available, on the screen dome, a field of about 220°, which requires that the said concave mirror should be replaced by a convex mirror which can provide a virtual image of the said screen dome, located slightly behind the said convex mirror and produced on a skew surface which of course depends on the radius of curvature of the said screen dome and on that of the said convex mirror.

Because of the substitution of a virtual image of the said screen dome, formed on a surface which can be roughly compared to a paraboloid of revolution, for the substantially plane real intermediate image which was formed by the concave mirror described in the above-mentioned certificate of addition, it is easy to understand that it becomes necessary to take account, in the calculation of the characteristics of the tele-objective of the projector to be used, of the curvature of the said virtual image and hence of the respective radii of curvature of the screen dome and of the said convex mirror, whereas the use of a concave mirror made it possible to obtain a sufficiently faithful enlarged image on the said screen dome from a substantially plane intermediate image provided by a tele-objective of the normal type.

In the new embodiment, the trainee pilot places himself near the convex mirror and the centre of the screen dome so as to see the whole of the projection, including the peripheral part which is turned backwards and located beyond the diametral plane of the screen dome, at right angles to the optical axis of the light beam which is located so as to coincide with the axis of symmetry of this dome.

Furthermore, in this new embodiment for a flight simulator, the said light beam is only inclined downwards at 20° to the horizontal and not at 45° as in the abovementioned third certificate of addition.

Another important characteristic of the new process according to the present invention resides in the obligatory use—in order to achieve a cinematographic projection capable of providing an image truly faithful to reality—of a special film-shooting camera and of a projection apparatus equipped with special means for running film, which means make it possible, after each shot or each projection of the image, to advance from one image to the next a special film which possesses, per image, a higher number of perforations than that of the standard films of this type, of the same size, intended for photographic projection.

Furthermore, the optical axis of the camera of shooting the said images must have the same inclination to the horizon as the axis of the said screen dome and in the particular case in question this inclination must also be 20° downwards, which was not obligatory in the case of the embodiments described in French Pat. No. 1,204,643 and in the three certificates of addition to this patent.

The new process can also be used for photography and video, but for cinemas of fairly large size the 35 mm films which can generally be used for the flight simulator application are inadequate and it is necessary to resort to 70 mm films in order to improve the definition of the image.

However, since for these cinemas it is pointless to provide an angular field of vision of 220°, and since a field of about 160° is therefore sufficient, it is advantageous to provide truncated images which can be inscribed in rectangles, in place of round images which do not allow the utilisation of the whole of the length of the films which is provided for each image.

Depending on the method of unwinding the films and on the orientation of the image at the time of projection, this truncature may be effected parallel to the direction of the film, near one of the rows of perforations of this film, or at right angles to this direction.

For the 16 mm films it is possible to provide the truncature parallel to the lines of perforations and to use films possessing two perforations per image.

However, for the 35 mm films which can in particular be used for the flight simulators it is necessary to provide eight perforations per image, whilst for the 70 mm films which can be used for projection in cinemas open to the public it is preferable to resort to films possessing fifteen perforations per image, as will be seen later in the description.

If on the other hand the truncation is oriented at right angles to the direction of the films and of the said rows of perforations, it is possible to manage with four perforations per image for the 35 mm films but the image is in that case significantly smaller than in the case of a longitudinal truncation.

In case of 70 mm films it is also possible, in the case of transverse truncation, to manage with eight perforations per image in place of fifteen, again with a significantly smaller image.

By way of indication, in the case of the 16 mm film with two perforations per image and with longitudinal truncation, images of 14 mm diameter, inscribed in rectangles of 14 mm × 11.32 mm, are obtained.

In the case of 35 mm films with longitudinal truncation, it is possible to obtain images inscribed in rectangles of about 32 mm × 25.89 mm.

Finally, for large projection rooms and for 70 mm films with longitudinal truncation of the images, it is possible to obtain images inscribed in rectangles of about 64 mm×51.78 mm.

In the case of transverse truncation it is possible to obtain images inscribed in rectangles of about 23 mm×18.60 mm with 35 mm films, whilst with 70 mm films it is possible to obtain images inscribed in rectangles of about 46 mm×37.20 mm.

It should be noted that for projection in cinemas open to the public at large, it is advantageous, in order to obtain sharp images, to employ the solution of fifteen perforations per image and of the 64 mm diameter images mentioned above.

In the case of the flight simulators, the 35 mm films which can normally be used for carrying out the novel process must in fact be provided with eight perforations per image to be projected, in place of four, which presents a problem of how to cause the film to advance by groups of eight perforations without the danger of subjecting this film to excessive acceleration which may cause it to tear.

In the case of 70 mm films and of the projection of truncated images, the same problem arises if it is a question of advancing the film by groups of fifteen perforations.

To solve this problem, it is preferred to use the known technique of horizontally unwinding the film, both for the projector and for the film-shooting camera, in combination with the so-called "electronic Maltese cross" process of Messrs. ATAC of Meudon.

By means of the combination of a tele-objective which, starting from round or truncated positive images of the said film, can provide real images coinciding with the abovementioned virtual image of a screen dome of suitable inclination, and makes it possible to obtain, in combination with the said convex mirror, an image field which may even reach 220°, with a film-shooting objective of the "fish-eye" type and a projection tele-objective, both having the same inclination of their optical axis relative to the horizon, it is possible to obtain, using special films and the special film running devices mentioned above, a virtually perfect simulation and the impression of an infinite space comparable to real space, instead of a finite or enclosed space such as that of a room.

However, this virtually perfect simulation is only obtained if it is possible to find, for each point of the projected image, viewed from the eye of the observer, an angle, relative to the axis of the said screen dome, which is equal to that which exists for each corresponding point of the photographed object, viewed from the centre of the film-shooting objective, relative to the optical axis of this objective.

The tele-objective used is thus calculated to conform to this condition.

The abovementioned "fish-eye" objectives, for example the Nikkor objectives of 6 mm focal length made by the Japanese company NIKON and respectively having relative apertures of F/2.6 and F/5.6, and which are usually employed to produce plane photographs which exhibit a progressive compression of the image towards its periphery in accordance with a linear distribution law, provide images which can prove perfectly satisfactory for application to flight simulators and can offer an observer, located near the centre of the said screen domes, a field which can be as such as 220°, provided, of course, that in setting up the projection tele-objectives account is taken not only of the linear compression law of the plane images given by these objectives as well as the aberrations produced by the said convex mirror, but also of the non-planar shape of the said virtual image of the screen dome formed by this convex mirror.

It should furthermore be noted that the adequate width of the field of view, which is an essential condition for achieving good simulation, is not a sufficient condition, and that it is also necessary to take account, in the calculation of the projection tele-objectives, of the successive deformations of the photographed object which are caused respectively during shooting and during projection, so as to be able to reproduce, on the projection, an image in which the various planes of the photographed object have retained, relative to one another, the respective positions which conform to the laws of perspective.

This result is achieved by calculating the said projection tele-objective taking account firstly of the linear law of compression, towards the periphery of the images to be projected which are obtained on film-shooting and, secondly, of the radius of curvature of the convex mirror used, located in the immediate vicinity of the centre of the screen dome, of the diameter of this mirror as well as of the radius of curvature of the said screen dome, and of the distance between the projection tele-objective and the said convex mirror.

In particular, the objective associated with the said convex mirror will necessarily be of the catadioptric type and will possess the correcting devices necessary to improve the compensation of the aberrations caused by the convex mirror, particularly at the edges of the image.

Furthermore, this tele-objective is preferably associated with a light condenser device possessing two distinct parts, of which the first is located near the light source and the second in the inlet aperture of the said tele-objective, the surface of which aperture must be completely covered by the image of the said light source provided by the said first part of the condenser.

Summarising, it is necessary to use, for film-shooting, at least a film of 35 mm as well as an objective of the "fish-eye" type which covers a field of sufficient annular size, within circular or truncated images, and provides a distortion corresponding to a linear law of compression of the image at its periphery, and it is also necessary that the axis of this objective is inclined to the horizon at an angle equal to that of the axis of the projection tele-objective and that this projection is carried out in such a way as to give a fathful anastigmatic image which does not exhibit distortion at its edges.

Furthermore, the advance of the film must allow the use of the whole of the surface of each of the circular or truncated images of the film which is used for shooting and for projection, and must take place in groups of perforations, each comprising a number of perforations increased in a ratio which can vary from 1 to 3.

In the case of the use of 35 mm films carrying round images of 23 mm diameter inscribed in each section it is preferred to use, for flight simulator applications, as stated earlier, a film-shooting axis which is normally inclined 20° downwards, that is to say having the same inclination to the horizontal as the axis of the spherical screen dome of 6.40 m diameter which is used for projection, and to use objectives which can provide a 220° field.

It has furthermore been found that it is advantageous to produce the projection screen dome from perforated aluminium sheet so as to achieve the best balance between directivity, luminosity and light reflection.

Furthermore, it is known that the increase in the number of perforations per image to be projected, which is referred to above, both for applications using round images and for applications using truncated images, requires the use of stepping motors to achieve the electronic synchronisation, which must be substituted for the conventional devices, controlled by a Maltese cross, in order to reduce the acceleration of the films used and to prevent the films from tearing.

However, the abovementioned convex mirror used for projection is placed slightly in front of the diametral plane of the screen dome at right angles to its axis of symmetry, and not behind, as was the case when using a concave mirror, but in any case this mirror remains in the immediate vicinity of the said diametral plane.

The replacement of a tele-objective of the standard type, having a natural field curvature in the same direction as that of the concave mirror used, by a tele-objective calculated especially to take into account the curvature of the said virtual image makes it possible to achieve, with a field which may be as much as 220° in certain applications, a quality which is at least equal to that which was achievable by using a concave mirror which can only give an image field of the order of 160°.

It has been mentioned above that the process according to the invention is also usable for video.

It is easy to understand that in this case, instead of using, for film shooting, a film with round or truncated "fish-eye" images, carrying an increased number of perforations, it suffices to substitute, for the said film, a plane photoelectric element such as a VIDICON tube target, equipped with a scanning device which allows the various images formed by the film-shooting objective on the sensitive surface of the said photoelectric element to be converted into electrical signals which can be transmitted either to a recording medium or to an image-reproducing device such as for example the apparatus known by the name of EIDOPHORE and sold by Messrs. PHILLIPS.

This apparatus is thus substituted for the film unwinding device and for the projector normally used for projection, in combination with the abovementioned tele-objective.

Figure 2:
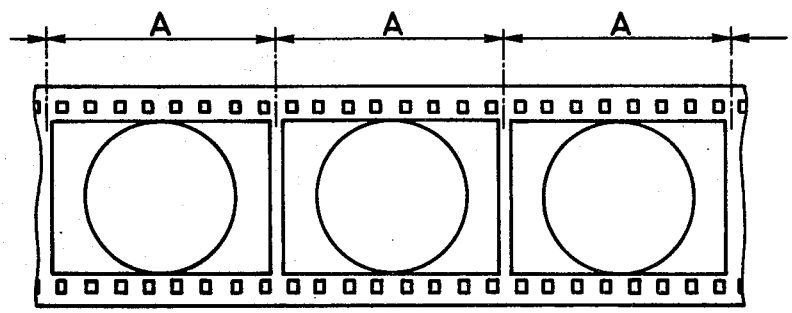
Figure 3:
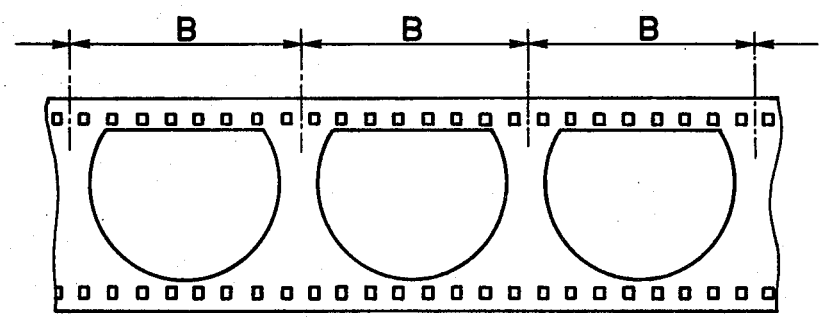
Figure 4:
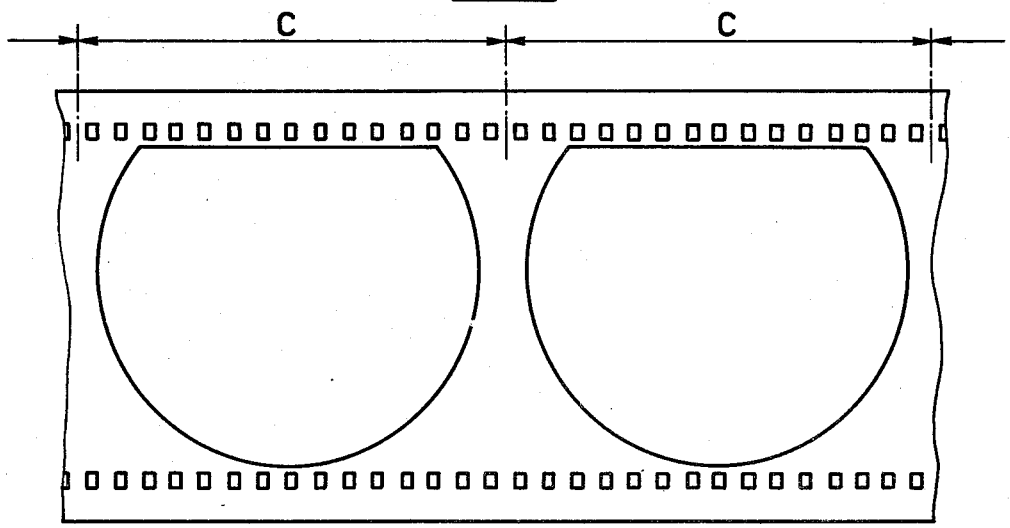

The features of the present invention will be better understood on reading the description given below of an embodiment of a film projection room produced in accordance with the process forming the subject of the present application and intended for application to flight simulators, this embodiment being given by way of a non-limiting example and being described with reference to the attached drawing in which:

FIG. 1 shows the path of the light rays emitted by a projector from the outlet of its tele-objective, and shows the position of the trainee pilot on the axis of the said screen dome, behind the said convex mirror, FIG. 2 is a plan view of a 35 mm film carrying circular images inscribed in non-contiguously juxtaposed rectangles, and carrying eight perforations per image, FIG. 3 is a plan view of a 35 mm film carrying non-contiguously juxtaposed truncated circular images and also carrying eight perforations per image and FIG. 4 is a plan view of a 70 mm film carrying truncated circular images of surface areas substantially equal to four times that of the images of FIG. 3, and carrying fifteen perforations per image.

Figure 5:
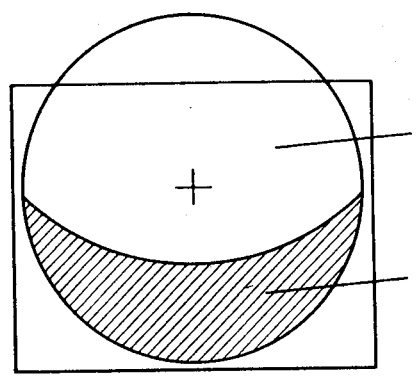

FIG. 5 shows the distribution of the truncated images of the film on the screen dome.

FIG. 1 shows a screen dome, on the various points of which are formed, by means of a projector 2, real images of a film of the abovementioned "fish-eye" type, by means of a tele-objective fixed in this projector, with the light rays emitted by the latter reflecting on plane mirrors 3 and 4 and then converging in the direction of the various points of a virtual image of the said screen dome located behind a convex mirror 5, the said converging rays being stopped by the said convex mirror and reflecting so as to converge towards the various points of the surface of the screen dome 1, whilst becoming distributed so as to conform to the laws of curvilinear perspective, and so as to permit, through suitable choice of the inclination of the film-shooting camera relative to the horizon, the reconstitution on the said screen dome of a faithful image of the space photographed during the film-shooting, and compensation of the linear law of compression of the circular images of the projected film.

Of course, the electrical devices used to drive films carrying an increased number of perforations are not shown on the drawing attached to the present patent application because these devices are independent of the subject of the invention described in the present application.

The observer 6, placed slightly behind the convex mirror 5, has his eyes near the axis of the light beam emitted by the projector 2 and reflected by the plane mirrors 3 and 4, so that he can see the whole of the image projected onto the said screen dome without being troubled by the light beam itself.

If reference is now made to FIG. 2, it will be seen that the images which are shown there only occupy, in the transverse direction, 23 mm of the 35 mm width of the film, because of the existence of the two longitudinal rows of perforations which frame these images.

The same FIG. 2 also shows that the film is rather badly utilised because, between two adjacent images of 23 mm diameter, there is an unused length of film of 15 mm.

The film shown in FIG. 2 carries eight perforations per image, located near each of the edges of this film.

The distance between the centres of two adjacent circular images is, in this figure, equal to the length occupied by each group of eight perforations on each of the rows of lateral perforations, namely A=38 mm.

In FIG. 3, which uses the same spacing between adjacent perforations, and the same number of eight perforations per image, occupying a total length B equal to 38 mm, that is to say equal to the length A of FIG. 2, it will be seen that the truncated images are noticeably larger than the circular images of this FIG. 2, and have a diameter of 32 mm instead of 23 mm, which corresponds to much better utilisation of the film, which is possible if there is no need to have an angular image field as high as 220°. The distance between two adjacent images in the longitudinal direction is in fact in this case 6 mm instead of 15 mm in the case of FIG. 2.

Finally, in the case of FIG. 4, the number of perforations per image is fifteen, occupying a length C equal to 71.25 mm, the distance between two adjacent truncated images of 64 mm diameter being, in this case, 7.25 mm.

FIG. 5 shows how a circular image taken by the film-shooting objective of the "fish-eye" type is reproduced, in the form of a longitudinally truncated circular image, on a film according to FIG. 3 or 4. The rectangle indicates the area of the film in which this circular truncated image must be inscribed. The perforations of the film are thus located outside this rectangle, parallel to the long sides of the latter. It will be seen that the centre of the circular image of the objective is staggered, at right-angles to the longitudinal direction of the film, relative to the centre of the rectangle. The part of the image not reproduced on the film because of the truncation corresponds to the part of the circular image which in any case would not be visible to the spectator or spectators on the screen dome. What is involved here is, in particular, the part of the dome which, towards the top, is located outside the field of vision of the spectators and can thus be omitted. In the case shown, this non-reproduced part of the image represents a part of the sky. These limits of the image produced on the dome from the truncated circular image of the film are thus in accord with the limits of the dome.

Of course various changes, improvements or additions can be made to the embodiment which has just been described, and certain components can be replaced by equivalent components without thereby altering the general economics of the invention.

In particular, the projector can be placed behind the orifice for the passage of the light beam made in the screen dome, at a sufficiently small distance from the orifice to make it possible to shorten the optical path separating the tele-objective of the projector 2 from the convex mirror 5, and its optical axis can in that case coincide with the axis of the screen dome, in which case the plane mirrors 3 and 4 can be omitted.

Furthermore, as has been stated above, the combination of the projector and of the film carrying the images to be projected can be replaced by an apparatus of the EIDOPHORE type if, instead of using, for the film-shooting, a cinematographic film with "fish-eye" images, possessing an increased number of drive perforations, the said film is replaced by a photoelectric element equipped with a scanning device which allows the various successive images formed by the film-shooting objective to be converted into electrical signals, and if these electrical signals are used either directly or after having been recorded on a suitable carrier, to reconstitute the said successive images and project them towards the abovementioned tele-objective, in the direction of the said screen-dome virtual image.

It should furthermore be noted that the "fish-eye" objectives can be modified so as to give images which have two symmetrical transverse truncations.

Such a possibility can in particular be of interest for 16 mm wide films carrying truncated images of 8 mm diameter inscribed in rectangles of 8 mm×7.40 mm.

It should furthermore be noted that the focal length of the objectives used can vary considerably depending on the application envisaged; a 6 mm focal length is normally used for flight simulators with a field of 220°, whilst for cinematographic projection in public cinemas it is preferred to use objectives with a focal length of 11.7 mm for 35 mm films and objectives with a 23.4 mm focal length for 70 mm films.

According to a variant, the projection tele-objective, with a spherical mirror, can be replaced by a "fish-eye" objective of the same type as that used for film-shooting, to which may be added an optical system for transferring the image between the projector, located outside the screen dome, and the said "fish-eye" objective, which is now situated at the centre of the screen dome.

I claim:

1. Process of wide angle film shooting and subsequent projection of images onto a concave screen essentially in the form of a spherical dome comprising
    forming on the film, for projection, a series of closely adjacent truncated circular images having their truncations oriented longitudinally of the length of the film and all located near a common side of the film which corresponds to an upper portion of the image to be projected onto the screen,
    said forming of said images on the film comprising
    shooting a scene on film using an incline objective of the "fish-eye" type having a wide aperture angular field as great as 220° and which provides progressive linear compression of the image towards its periphery,
    projecting said images formed on the film onto said screen through a tele-objective and a convex mirror positioned in the center of said screen and having its axis of symmetry inclined at the same angle as said objective used to shoot the scene, and adapated to the screen, said step of projecting said images comprising orienting said film so that the side of the film adjacent the truncations corresponds to the upper portion of the image projected on the screen and moving the so oriented film horizontally,
    locating the tele-objective, during projection, at a distance from said convex mirror to enable the real image of each point of a film image to coincide with a corresponding point of the incurved virtual image formed on said screen by said convex mirror,
    and compensating for aberrations caused by the said mirror at edges of said screen so as to produce on said screen a faithful image of the perspective of the scene.

2. Process for film-shooting and projecting, according to claim 1, in which said projecting of the images comprises projecting the images through a tele-objective having two correcting elements for compensating aberrations.

3. Process for film-shooting and projection according to claim 2, in which the said tele-objective is associated with a light condenser having two separate elements respectively located near the light source and in an inlet aperture of the tele-objective, so that the first element forms, at said inlet aperture, an image of said light source which occupies the whole surface of this aperture.

4. Process for film-shooting and projection, according to claim 1, wherein the screen is a screen of a flight simulator, and in which a film of 35 mm width and a film-shooting objective of the "fish-eye" type, of 6 mm focal length, having a relative aperature of at most F/2.8 and preferably equal to F/5.6, are used.

5. Process for film-shooting and projection, according to claim 4, in which said angular field is 220°, the said screen dome has a surface to display the 220° field and an axis of symmetry inclined downwardly at an angle of 20°, during projection, and in which the angle of inclination of the fish-eye lens during shooting is inclined downwards at an angle of 20°.

6. Process for film-shooting and projection, according to claim 1, for cinematographic projections in public cinemas in which the film is a 35 mm film, and the objective of the "fish-eye" type used during shooting has an 11.7 mm focal length.

7. Process for film-shooting and projection, according to claim 1 for cinematographic projections in public cinemas and in which the film is a 70 mm film, and the objective of the "fish-eye" type used during shooting has a 23.4 mm focal length.

8. Process for film-shooting and projection, according to claim 1, in which a 16 mm film possessing a single row of two perforations per image is used, and in which the film-shooting objective is adapted to obtain, on said film, truncated images of 14 mm diameter inscribed in rectangles of 14 mm × 11.32 mm.

9. Process for film-shooting and projection, according to claim 1, in which 35 mm film is used having two symmetrical rows of perforations, the objective produces on said film, truncated circular images having their truncation oriented longitudinally and located near one of the said rows of symmetrical perforations, each of the rows having eight perforations per image, so as to provide, for projection, truncated images having a diameter of 32 mm, which allow the reconstitution of an image field of at least 160° in all azimuths which do not correspond to the said truncations.

10. Process for film-shooting and projection, according to claim 1, in which 70 mm film is used having two symmetrical rows of perforations, the objective produces on said film, truncated circular images having their truncation oriented longitudinally and located near one of the said rows of symmetrical perforations, each of the rows having fifteen perforations per image, so as to provide, for projection, truncated images having a diameter of 64 mm, which allow the reconstitution of an image field of at least 160° in all azimuths which do not correspond to the said truncations.

11. Process for film-shooting and projection, according to claim 1, in which a 35 mm film is used, the film has two symmetrical rows of four perforations per image, and circular images of 23 mm diameter which are truncated longitudinally and inscribed in rectangles of 23 mm × 18.60 mm.

12. Process for film-shooting and projection, according to claim 1, in which a 70 mm wide film is used, the film has two symmetrical rows of eight perforations per image, and circular images of 46 mm diameter which are truncated longitudinally and inscribed in rectangles of 46 mm × 37.20 mm.

13. Process for film-shooting and projection according to claim 1 wherein each truncated circular image has a length, longitudinally of the film, which is greater than the image width of the film.

* * * * *

UNITED STATES PATENT AND TRADEMARK OFFICE
CERTIFICATE OF CORRECTION

PATENT NO. : 4,464,029
DATED : August 7, 1984
INVENTOR(S) : PHILIPPE JAULMES

It is certified that error appears in the above—identified patent and that said Letters Patent is hereby corrected as shown below:

In the heading correct the inventor's name as follows:

[76] Inventor: PHILIPPE JAULMES

In the heading correct the RELATED U.S. APPLICATION DATA as follows:

[63] Continuation of Ser.No. 207,465, Nov. 17, 1980, abandoned, which is a continuation of Ser. No. 943,557, Sep. 18, 1978, abandoned.

Signed and Sealed this

Twenty-seventh Day of November 1984

[SEAL]

*Attest:*

GERALD J. MOSSINGHOFF

*Attesting Officer*  *Commissioner of Patents and Trademarks*